United States Patent [19]
Baumann

[11] 4,044,165
[45] Aug. 23, 1977

[54] PROCESS FOR PREPARING PRECOOKED PASTA PRODUCTS

[76] Inventor: Gérard Baumann, 60 Avenue Henri Martin, 75016 Paris, France

[21] Appl. No.: 609,075

[22] Filed: Aug. 29, 1975

[30] Foreign Application Priority Data

Aug. 29, 1974  France .................................. 74.29492

[51] Int. Cl.$^2$ ............................................... A23L 1/16
[52] U.S. Cl. .................................... 426/557; 426/662
[58] Field of Search ................................ 426/557, 662

[56] References Cited
U.S. PATENT DOCUMENTS

| | | | |
|---|---|---|---|
| 2,629,662 | 2/1953 | Julian et al. .......................... | 426/662 |
| 3,162,536 | 12/1964 | Kaufman .............................. | 426/557 |
| 3,846,563 | 11/1974 | Cunningham ........................ | 426/557 |

FOREIGN PATENT DOCUMENTS 1,538,067  7/1968  France .................................. 426/557

Primary Examiner—Jeanette M. Hunter

[57] ABSTRACT

In view of obtaining precooked pasta products with a good shelflife, wheat semolina, with or without food additives, is mixed with 15 to 20% by weight of cold water on the basis of the weight of the semolina, the dough obtained is cooked during its extrusion under high pressure, at temperatures ranging between 90° C and 110° C, causing the gelatinization of the starch, the extrusion-cooked product is then dried down to the legal moisture level (equal to or under 12.5% by weight), and cooled, the end product being rehydrated at the time of consumption by heating in boiling water for less than 5 minutes.

7 Claims, 1 Drawing Figure

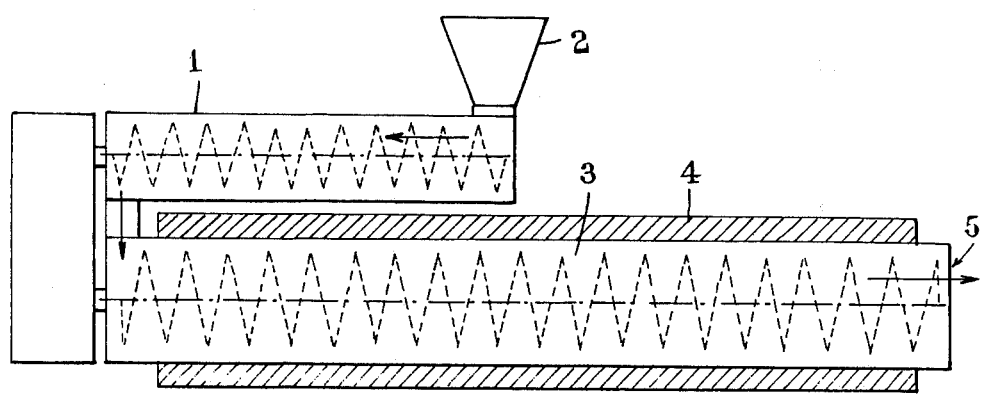

PROCESS FOR PREPARING PRECOOKED PASTA PRODUCTS

BACKGROUND OF THE INVENTION

Raw pasta products are defined as the products obtained by extrusion and/or cold rolling of a mix of durum semolina with water, optionally with addition of eggs, powdered eggs, egg yolk and the like. According to regulations their moisture is brought down to 12.5% maximum in a slow-drying process, before eventual paskaging.

In order to be used, pasta products should be cooked, in boiling salted water, for about 15 minutes. The delay depends mostly on the thickness of the paste strips, and therefore of the shape (spaghetti, macaroni, noodles and the like).

Today, the consumer's demand for food requiring always less preparation time leads to a research on the means of sparing a few minutes on the cooking time of the pasta-products. Attempts have been made through a reduction of the thickness of the paste strips. This led to a not-so-good-looking cooked paste at the time of serving (bad comportment and therefore lesser appetency).

The traditional way of making paste consists in mixing semolina with 15% by weight of moisture (average contents) with a certain quantity of water, then in extruding and/or cold rolling the obtained dough and drying the paste down to the legal moisture level (maximum 12.5%) of the dry uncooked current pasta products.

It is known that precooked pasta products can be obtained by submitting the paste to a drying/cooking process at temperatures between 150° C and 370° C (French Pat. No. 1,437,015). The product obtained however has a strong toasted taste, too far from the neutral flavor usually looked for in pasta products.

It is also known to make expanded precooked grain basis food products by heating at 200° C during extrusion durum wheat semolina or corn grits with a 15% moisture level; these expanded products however do not look or taste like traditional pasta products.

A process for making precooked pasta products is also known (French Pat. No. 1,538,067) which consists in the heating at 95° C during extrusion of a dough, looking like a pancakes preparation, and made by mixing flour with a quantity of water approximately equal to the quantity existing in the final cooked product, i.e. up to twice the weight of the flour; the cooked pasta products obtained can be eaten immediately or after reheating, but have to be consumed within a short delay, these products being perishable. It is an artisan's process.

SUMMARY OF THE INVENTION

The present invention relates to the production of precooked pasta products whose starch is gelatinized, which contain no more than 12.5% moisture, which have a good shelflife and, after rehydration and heating with boiling water for less than 5 minutes, have the usual taste, looks and flavor of traditional pasta products.

One object of the invention is to provide an industrial process for the production of such precooked pasta by extrusion cooking, comprising the mixing of wheat semolina, optionally, mixed with food additives, with water, the cooking and the extrusion of the mix and the drying of the extrusion-cooked product down to the legal moisture level which must be equal to or under 12.5% by weight), this process being characterized by the fact that the mixing of the water and the semolina is operated with 15 to 20% by weight of cold water on the basis of the weight of the semolina and that the obtained dough is simultaneously cooked and extruded under high pressure, at temperatures ranging between 90° C and 110° C leading to gelatinization of the starch. Preferred temperatures are in the 90° to 98° C range.

Lipoxydase, an enzyme which destroys the yellow color looked for in pasta products is inhibited by heating and the sterilized pasta can be stored for longer periods.

Another object of the invention is to provide a machine designed to produce such precooked pasta products characterized in that it comprises in combination a mixer-blender designed for the mixing of the semolina and the water, for the evening up of the moisture level of the dough in preparation, and for making it proceed forward within a determined time delay, and a high pressure extruder-cooker capable of kneading, homogenizing and putting under pressure the dough under process while cooking it during its extrusion up to the time of the starch gelatinization. The cooking part of the extrusion-cooker device is notably constituted by a jacket laid around all or part of the extrusion device. The aforesaid jacket is advantageously heated by electricity in the form of induction currents.

The obtained product, cooled, dried and packed has a shelf life similar to the one of normal uncooked pasta products. It can be consumed after rehydration and heating with boiling water for a time inferior to 5 min. during which it absorbs 1½ to 2 times approximately its weight of water.

The invention also provides the precooked pasta products obtained, which may contain food surfactants added to the semolina in process, and in particular lecithin, soy lecithin for example.

DESCRIPTION OF THE DRAWING

Other characteristic features of the invention will be described with more details hereafter, as a non limiting example in reference to the annexed drawing on which the unique FIGURE shows schematically a machine designed to produce such precooked pasta products. On the drawing, the reference No. 1 designates a blender-mixer with its hopper No. 2, and the No. 3 the extrusion device within the cooker No. 4.

The blender-mixer, designed to mix without heating the semolina and the water, to even up the moisture level of the dough in preparation and to make it proceed forward within a determined time delay towards the head of the extrusion device, comprises at least one screw with separate blades set in spiral.

The high pressure extrusion device is preferably composed of two co-penetrating screws housed in a metal block suitably bored of two secant cylinders in an 8 shape, these screws being of modular design and interchangeable, and therefore constituted by juxtaposition of elements whose thread-shape and steps are different; these screws are designed to knead, homogenize and bring to pressure the matter to be extruded.

At the end of the screws, the matter, heated to the required temperature, is drawn under high pressure through the drawplate or die No. 5.

The cooker is constituted by a jacket laid around all or part of the extrusion device, suitably heated by a heating fluid flowing at countercurrent of the product to be extruded or by electricity, by use of resistors or preferrably induction currrents; the heating is led at controlled temperatures which differ according to the progression stage of the dough in the extrusion device.

In the extrusion-cooker, after kneading to the different components, the dough is progressively brought to the temperature of starch gelatinization.

PREFERRED EMBODIMENT

In the process under consideration, a mixture of semolina, preferably of durum wheat, and water in a determined ratio, are submitted to extrusion-cooking. There may be added to the semolina eggs, powdered eggs, powdered egg yolk, food surfactants and/or any food additive such as gluten, which may be added to pasta products.

The word "SEMOLINA" is used here, as it is the most suitable rawstuff for pasta products production. However, nothing, except custom and regulations, forbide the production of food products looking like pasta and made of grainmilling products and/or of starchy products.

It is foreseen, according to an advantageous characteristic of the invention, to add to the worked up semolina food surfactants such as lecithin, in a proportion of about 5% by weight of the semolina. The purpose of this addition is to avoid expansion at the exit of the drawplate or die.

When a mix of semolina and water in the indicated proportions is treated at a temperature above the temperature of starch gelatinization, a new product is obtained, which has a good shelf life, whose starch is gelatinized, whose preparation time is greatly reduced (less than 5 minutes) and whose taste and looks after rehydration are those of traditional pasta products. This "cooking" duration may be limited to the delay required for the rehydration of the precooked pasta product.

To hasten the drying after extrusion, it is desirable to realize a degasing during the extrusion-cooking, which will eliminate part of the water used to build up the dough. The moisture level of the product after extrusion-cooking can be brought to less than 20% by weight.

The final drying, required to bring the product to a conservation moisture level of 12.5%, or less, is realized with a standard pasta dryer.

EXAMPLE

A blend, comprising durum wheat semolina (at 15% moisture) and cold water (20% in weight of the weight of the semolina) is mixed without heating in an extrusion-cooker equiped with a 2 mm inside diameter drawplate ordie.

Through a progressive heating in the apparatus, the dough is brought to the temperature of 90°–95° C. The product output at the exit of the drawplate is of 20 kgs/hour and the moisture level of the extruded product, after cooling, is of 25% by weight.

The length of the stay of the material in the extruder is inferior to 2 minutes.

A drying process according to standard procedure for pasta, in a controlled atmosphere, brings down to 12.5% the moisture contents of the precooked pasta produced by the extruder. The pasta products are then ready for packaging.

A nozzle permitting degasing provided on the extruder may allow steam to escape at atmospheric pressure or under partial vacuum, during the extrusion-cooking process; in this case, at the exit of the drawplate the precooked pasta product contain less than 20% by weight of water, a fact which will reduce the duration of the drying process and may even suppress it altogether.

The delay of rehydration in boiling water of the obtained pasta is of about 5 minutes, for a spaghetti of a 2 mm diameter prepared according to this example.

Modifications in details, in the field of technical equivalents, may be brought to the process according to the invention and to the device used for its working up, without departing from the scope of the invention.

What is claimed is:

1. A process of producing precooked pasta products with a good shelf-life and having, after preparation at the time of consumption, the usual looks, taste and flavor of ordinary pasta products, consisting essentially of, mixing without heating, wheat semolina with 15 to 20% by weight of cold water on the basis of the weight of the semolina to form a dough and thereafter cooking and simultaneously extruding the thus obtained dough under high pressure at temperatures ranging between 90° C and 110° C to gelatinize the starch in the wheat semolina, and drying the extrusion-cooked product to a final moisture content of about 12.5% by weight.

2. A process according to claim 1, wherein the dough is cooked, during its high pressure extrusion, at temperatures in the 90° C to 98° C range.

3. A process according to claim 1, wherein the extrusion is carried out in a high pressure extrusion-cooker, wherein the dough is at the same time put under pressure and heated to the temperature of starch gelatinization.

4. Precooked pasta products produced by the process according to claim 1.

5. A process according to claim 1, wherein said wheat semolina is mixed with food additives.

6. A process for producing precooked pasta products with a good shelf-life and having after preparation at the time of consumption the usual looks, taste and flavor of ordinary pasta products, consisting essentially of: mixing wheat semolina with 15 to 20% by weight of cold water on the basis of the weight of the semolina, said wheat semolina being mixed with food surfactants, in a proportion of about 5% of the weight of the semolina to form a dough and thereafter, cooking and simultaneously extruding the thus obtained dough under high pressure at temperatures ranging between 90° C and 110° C to gelatinize the starch in the wheat semolina and drying the extrusion-cooked product to a final moisture content of about 12.5% by weight.

7. A process according to claim 6, wherein said food surfactant is soy lecithin.

* * * * *